US007382564B1

(12) United States Patent
Everett et al.

(10) Patent No.: US 7,382,564 B1
(45) Date of Patent: Jun. 3, 2008

(54) ACQUIRING SPIRAL SERVO INFORMATION ON A STORAGE SURFACE

(75) Inventors: Tim Everett, Niwot, CO (US); John VanLaanen, Louisville, CO (US); Howard Barlow, Loveland, CO (US); Robert L. Metz, Westminster, CO (US)

(73) Assignee: Maxtor Corporation, Scotts Valley, CA (US)

( * ) Notice: Subject to any disclaimer, the term of this patent is extended or adjusted under 35 U.S.C. 154(b) by 660 days.

(21) Appl. No.: 10/858,846

(22) Filed: Jun. 2, 2004

Related U.S. Application Data

(60) Provisional application No. 60/475,051, filed on Jun. 2, 2003.

(51) Int. Cl.
*G11B 21/02* (2006.01)
*G11B 5/596* (2006.01)
*G11B 5/09* (2006.01)

(52) U.S. Cl. .................. 360/75; 360/77.11; 360/51
(58) Field of Classification Search .................. None
See application file for complete search history.

(56) References Cited

U.S. PATENT DOCUMENTS

| 6,920,004 B1 * | 7/2005 | Codilian et al. ............ 360/51 |
| 6,985,316 B1 * | 1/2006 | Liikanen et al. ............ 360/29 |
| 7,230,786 B1 * | 6/2007 | Ray et al. .................. 360/75 |

* cited by examiner

*Primary Examiner*—Andrew L. Sniezek
(74) *Attorney, Agent, or Firm*—Fellers, Snider, et al.

(57) ABSTRACT

Various embodiments of the present invention are generally directed to processing servo data on a storage surface by detecting a time difference between consecutive read signal envelopes from spiral servo information on the surface.

19 Claims, 10 Drawing Sheets

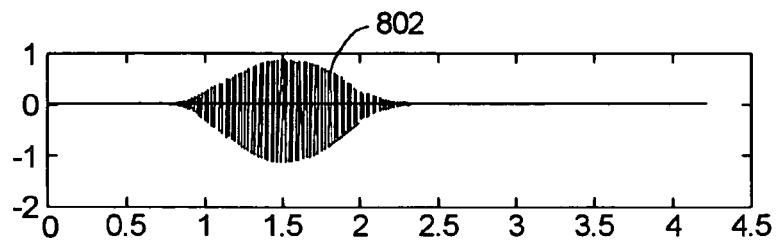
FIG. 8
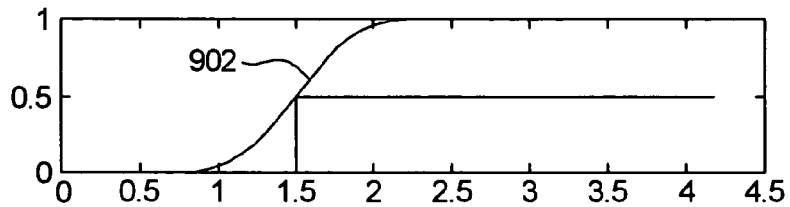
FIG. 9
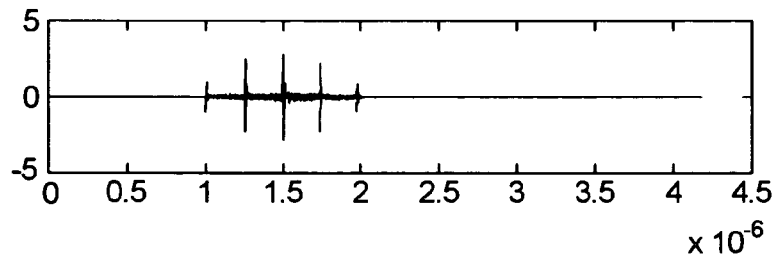
FIG. 10
FIG. 11
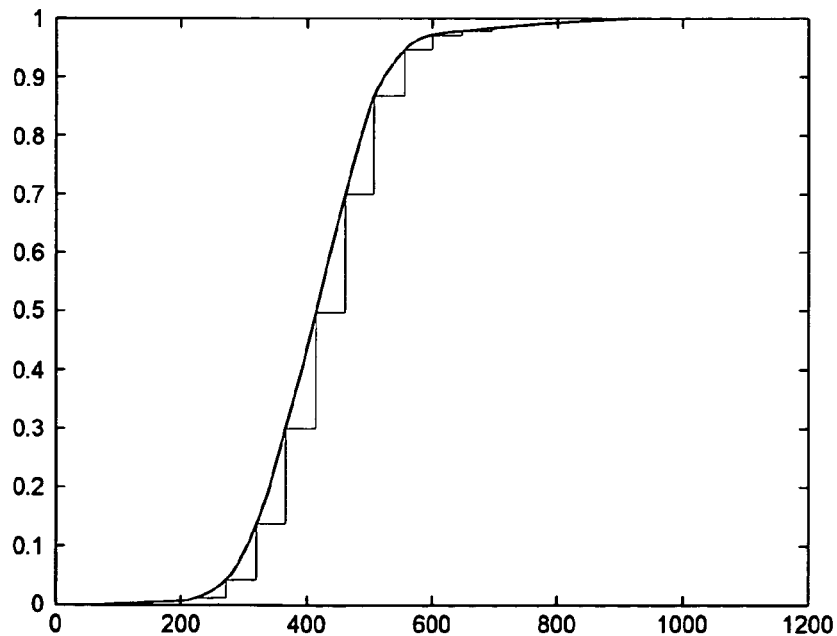

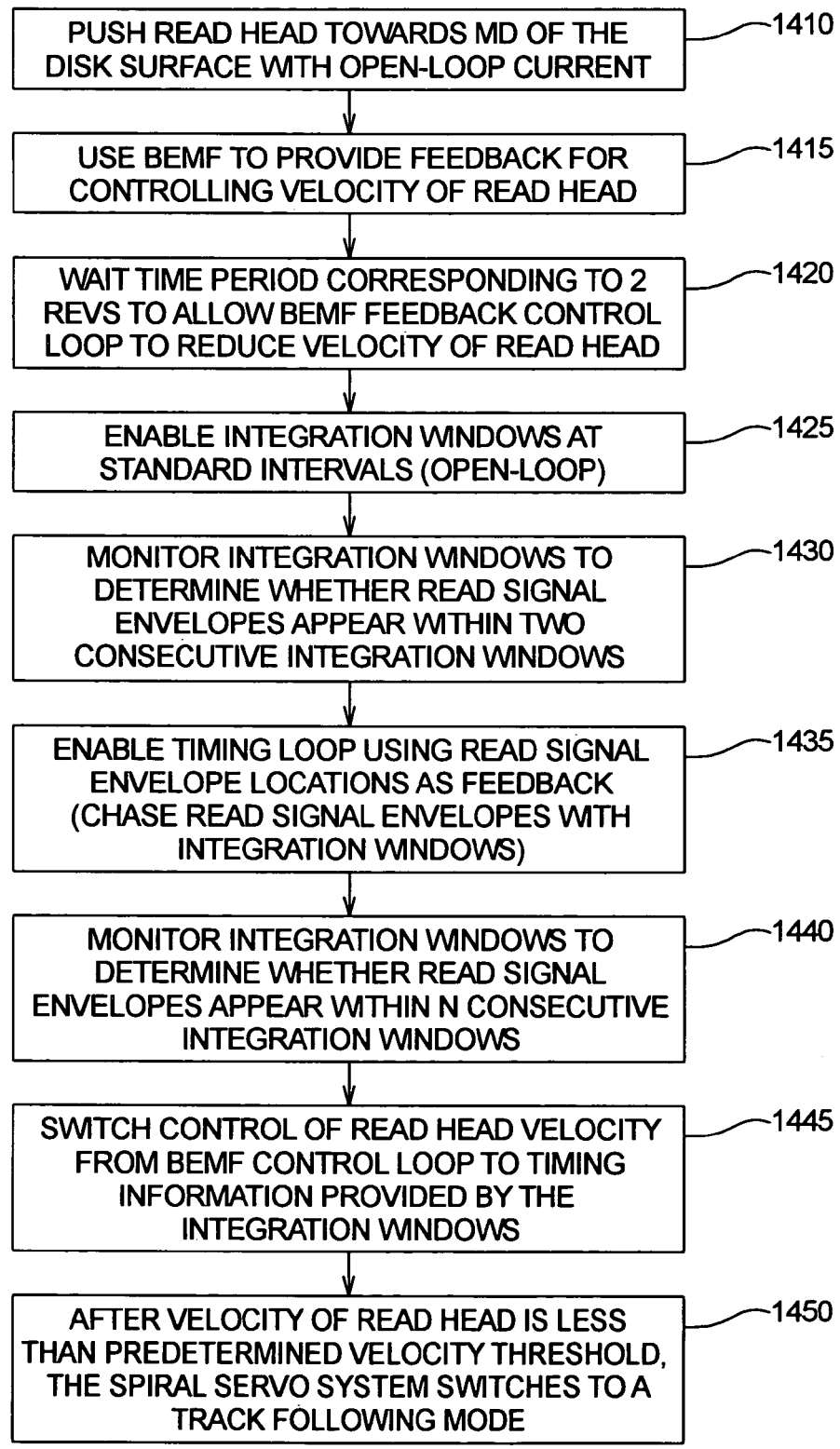

ACQUIRING SPIRAL SERVO INFORMATION ON A STORAGE SURFACE

CROSS-REFERENCE TO RELATED APPLICATIONS

Priority is claimed from U.S. Provisional Patent Application Ser. No. 60/475,051 filed Jun. 2, 2003, which is incorporated herein by reference in its entirety.

FIELD OF THE INVENTION

The present invention relates generally to data storage devices, such as disk drives. More particularly, the present invention relates to a method and apparatus for acquiring onto spiral servo information written on a disk surface of a disk drive.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$ for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from the outer diameter of the disk to the inner diameter of the disk (or visa-versa) as the disk spins.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals may be written on the disk surface 110. Accordingly, by writing servo information in a spiral fashion, the time necessary to write servo information on disk surface 110 using the STW is a function of the servo sample rate (i.e., the number of spirals of servo information to be written) rather than the number of tracks.

FIG. 6 is a diagrammatic representation of a magnified view of a portion of FIG. 5 showing additional spirals of servo information (i.e., portions of four spirals are shown in FIG. 6). Furthermore, FIG. 6 is shown in a linear, instead of arcuate fashion, for ease of depiction.

At any given track 220 (Data Tracks 24-40 are depicted in FIG. 6), the disk drive's read head 230 (also referred to herein as the reader) will cross over the spirals of servo information at intervals equal to the sample rate. Furthermore, the read head 230 will cross over the spirals of servo information at an angle. Additionally, the number of spirals of servo information that cross each of the tracks 220 will be equivalent. For a given track 220, the spacing between adjacent spirals of servo information will be approximately equidistant.

It should be noted that a read head 230 placed on a track 220 closer to the inner diameter (ID) of the disk surface 210 will cross a given spiral of servo information at a time slightly delayed from a track 220 closer to the outer diameter (OD) of the disk surface. For example, suppose that: (1) time zero (t=0) is defined towards the right side of FIG. 6; (2) time increases in the figure from right to left along the horizontal; and, (3) the disk is rotating in the direction indicated by corresponding arrow shown in FIG. 6. If the read head 230 was placed above Data Track 26 at time zero and the disk was rotated, the read head 230 would cross Spiral 2 at a point later in time than if the read head 230 was placed on Data Track 37 under similar conditions, since Data Track 26 is closer to the inner diameter than Data Track 37.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for its entire stroke (i.e., from OD to ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

FIG. 7 is a diagrammatic representation of a magnified portion of one of the spirals of servo information shown in FIG. 6. FIG. 7 is intended to provide a representation of the track pitch (TP) of a circumferential data track and the reader width (RW). The spiral 700 is a continuous, single-frequency pattern having sync marks 702 embedded therein. The sync marks 702 constitute phase shifts within the spiral pattern. In FIG. 7, the sync marks 702 are shown as regularly-space white areas within the spiral 700.

FIG. 8 is a diagrammatic representation of a read signal that is generated as the reader 230 reads a portion of a spiral of servo information while the disk is spinning. In FIG. 8, the x-axis represents time, while the y-axis represents signal amplitude. The depicted shape is known herein as the read signal envelope 802.

In general, the shape of each read signal envelope 802 will be approximately the same (e.g., roughly a football shape) over the entire disk surface. The position of the read signal envelope in time changes based upon the position of the reader 230. Although the read signal envelope moves relative to the position of the reader 230, the sync pattern within the spiral being read does not move. Accordingly, the envelope moves relative to the sync marks. Since the sync marks are at known radial positions, the sync marks provide a position reference.

A position error signal (PES) is determined by calculating the position of the reader relative to a known reference point (i.e., one of the sync marks) within the spiral servo pattern. The position of the reader is given by the centroid of the read signal envelope and is determined by integrating the read signal envelope over a hardware integration window of fixed-size (described in more detail below) to determine the read signal envelope's area (i.e., by performing a power integration) and, then, dividing by two. This is known as the half-integrator value.

A diagrammatic representation of an integration curve 902 in normalized units is shown in FIG. 9. The position of the reader is at 1.5 arbitrary units along the x-axis, where half of the integrated value of the read signal envelope is to the right of the position of the reader and half of the integrated value of the read signal envelope is to the left of the position of the reader.

As mentioned above, once the position of the reader is determined (i.e., by determining the half-integration value), the PES is determined by comparing the position of the reader relative to one of the sync marks. FIG. 10 is a diagrammatic representation illustrating five (5) sync marks in the read signal envelope.

To determine the time at which the half integrator value occurs, it is necessary to record the integration values at various sample points over the integration interval, wherein the integration interval is defined by the integration window. One convenient sample interval is the same as the sync-mark-to-sync-mark interval. This sample interval "frames" a sync mark and, therefore, is known as the frame interval (or frame). The spiral energy integration value is determined at each frame interval and accumulated, so that the time of the reader position can be calculated after the entire spiral has passed under the reader. An example of saved integrator values is shown in FIG. 11. It should be noted that the values in FIG. 11 do not correspond to the read signal envelope of FIG. 8. Instead, the values in FIG. 11 are based on an altogether different read signal envelope.

To reference the position of the reader relative to a sync mark, the time at which each occurs must be known. The time of the reader position is found by searching the array of integrator values to find the corresponding frame interval containing the half integrator value. Linear interpolation is used to find the exact time of the half-integrator value relative to one of the end points of the frame interval. The interpolation uses the saved integrator values on either side of the half-integrator value to compute a localized slope of the integrator around the head position. The localized slope calculation incorporates the change in integrator values over a known distance.

To reference the reader position to the known reference points in the spiral, the time is saved at which each sync mark is detected. Because the frame interval is the same as the sync to sync interval, a clock is started at the beginning of each frame to count the time from the beginning of the frame to when a sync mark is detected. This time may also be saved in an array similar to the integrator values. A computation is then performed to determine the difference in time from (1) the beginning of the frame interval to the reader position and (2) the beginning of the frame interval to the sync position. The difference in time is then scaled to position by the relationship between the sync-to-sync spacing of radius and time.

Once the reader position is referenced to a sync mark, a determination must be made as to whether the reader position and the sync mark are the desired, or targets, of the track following system. If the reader position is found to be 10% away from a sync mark, but the sync mark is actually 1 away from the target sync mark, then the sync-to-sync spacing must be added to the reader position to demodulate the full reader position. For example, if there were 4 sync marks per track, then the sync spacing is 25% of a track. If the reader position is found to be 10% away from a sync mark and the sync mark is 1 away from the target sync mark, then the position of the reader would be demodulated as 35% of a track away from the target location.

FIG. 12 is a schematic representation of an integration window (or gate) 1202 and a read signal envelope 1204. The integration window 1202 is opened around the expected position of the read signal envelope 1204.

In fact, integration windows are opened at standard intervals of time based upon a known spacing between spirals. For clarity, it should be understood that the standard intervals of time are measured from the end of a first integration window to the beginning of the next integration window. Furthermore, as mentioned above, the integration windows have a fixed size (in time).

In FIG. 12, the read signal envelope 1204 is centered in the integration window 1202. In such case, the position error signal (PES) would be zero. Assuming zero velocity for the read head (and ideal placement of the spirals on the disk surface), read signal envelopes associated with the other spirals of servo information will appear in the center of their corresponding integration windows.

FIG. 13A is a schematic illustration of a read signal envelope 1304 that is centered in the integration window 1302 (i.e., the PES should be zero). FIG. 13B is a schematic illustration of a curve representing accumulated integration values across the integration window, wherein each dot represents accumulated integration values at a frame.

In order to position the head relative to the disk surface using spiral servo information, a synchronization process must occur, so that the spiral servo information can be used for position and timing feedback. A synchronization process is needed, for example, when a head goes from being positioned in a landing zone (e.g., in contact start/stop drives) to being positioned over a usable area over the disk surface or, equivalently, when a head goes from being unloaded (e.g., on a ramp or against a crash stop) to being loaded over the disk surface.

To perform one synchronization technique, the disk drive's write head, under control of a STW, is used to write a small band of conventional servo patterns (e.g., embedded servo information) onto the disk surface (e.g., near its inner or outer diameter). The disk drive's write head (again, under control of the STW) is also used to write spiral servo information starting at (or ending at) a location adjacent to the conventional servo patterns. Using conventional techniques, the read head is "pushed-off" a ramp and the positioning system locks to the conventional servo patterns. It should be understood that the term "push-off" includes movement of the read head from a location where servo information is not available for reading to a location on the disk surface where servo information is available for reading. Then, the read head "jumps" to the spiral servo pattern. Because the initial head velocity is zero and because there is a stable timing reference, it is relatively easy to synchronize to the spiral servo information.

While effective, the above-described synchronization technique has at least one disadvantage. Specifically, as mentioned above, a STW is used to position a write head when writing the small band of conventional servo information on the disk surface. This increases manufacturing times and manufacturing costs, as compared to using the STW to write only spiral servo information onto the disk surface.

Therefore, it would be desirable to provide a technique for pushing-off and synchronizing to the spiral information without using a STW to write a small band of conventional information on the disk surface.

SUMMARY

Various embodiments of the present invention are generally directed to processing servo data on a storage surface by detecting a time difference between consecutive read signal envelopes from spiral servo information on the surface.

In accordance with some embodiments, a method generally comprises steps of providing a storage surface and a read head associated therewith, said surface having spiral servo information written thereon and said read head generating a read signal envelope when reading said spiral servo information. Current is applied to an actuator voice coil coupled to the read head to move the read head relative to the surface, and a time difference is determined in relation to a first time at which a first read signal envelope is detected by the read head and a second time at which a second read signal envelope is detected by the read head.

In accordance with other embodiments, a method generally comprises providing a storage surface and a read head associated therewith, said surface having spiral servo information written thereon and said read head generating a read signal envelope when reading said spiral servo information. Current is applied to an actuator voice coil coupled to the read head to move the read head relative to the surface, and integration windows are opened to detect at least two consecutive read signal envelopes from the read head.

In accordance with other embodiments, an apparatus generally comprises a storage surface and a read head associated therewith, said surface having spiral servo information written thereon and said read head generating a read signal envelope when reading said spiral servo information. A controller generally operates to direct an application of current to an actuator voice coil coupled to the read head to move the read head relative to the surface, and to determine a time difference in relation to a first time at which a first read signal envelope is detected by the read head and a second time at which a second read signal envelope is detected by the read head.

BRIEF DESCRIPTION OF THE DRAWINGS

FIG. 8 is a diagrammatic representation of a read signal that is generated as the reader reads a portion of a spiral of servo information while the disk is spinning;

FIG. 9 is a diagrammatic representation of an integration curve in normalized units;

FIG. 10 is a diagrammatic representation illustrating five (5) sync marks in a read signal envelope;

FIG. 11 is a diagrammatic representation of exemplary saved integrator values;

FIG. 14 is a flowchart illustrating an embodiment of the present invention;

DETAILED DESCRIPTION OF THE PREFERRED EMBODIMENT

Figure 1:
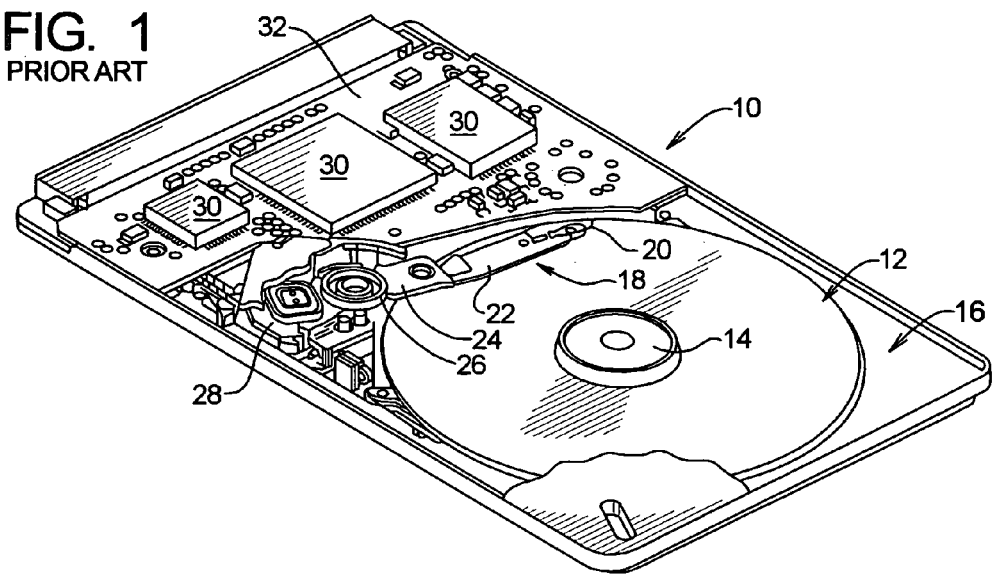
FIG. 1 is a diagrammatic representation illustrating a conventional disk drive with its top cover removed.
Figure 2:
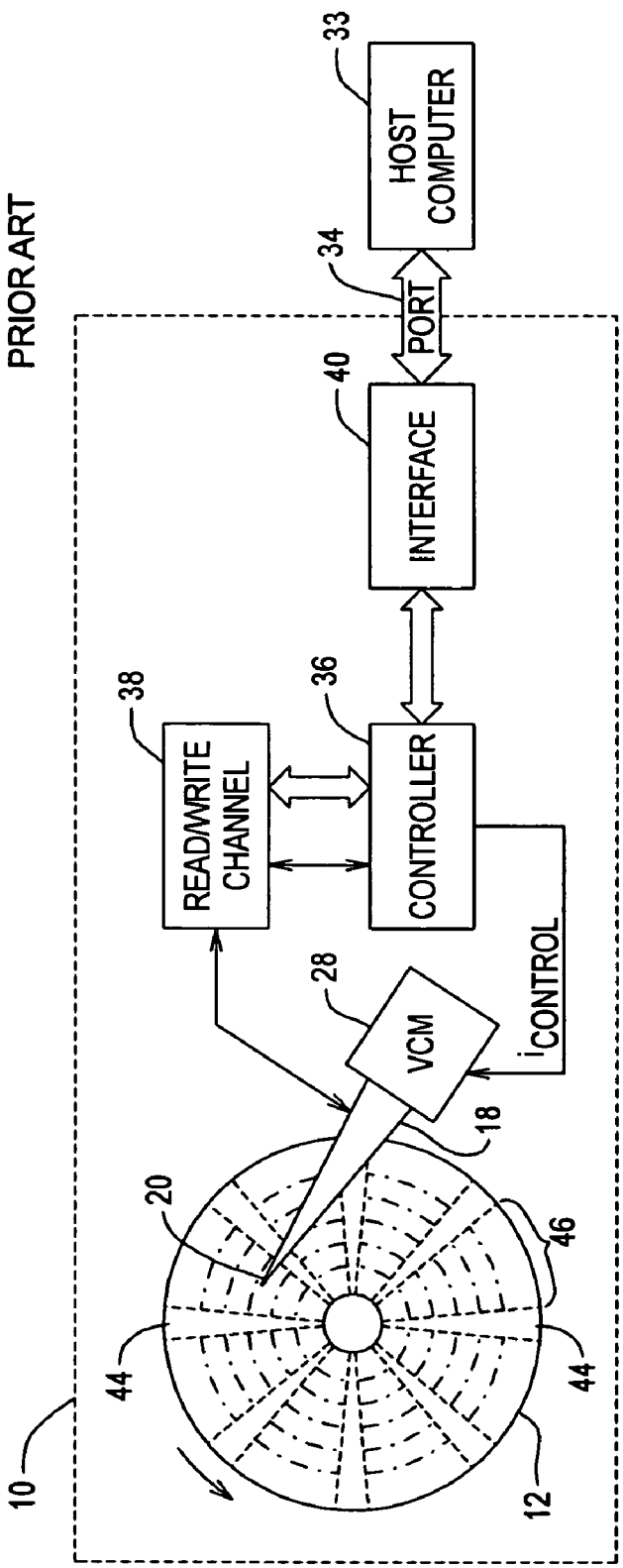
FIG. 2 is a functional block diagram which illustrates a conventional disk drive that is coupled to a host computer via an input/output port.
Figure 3:
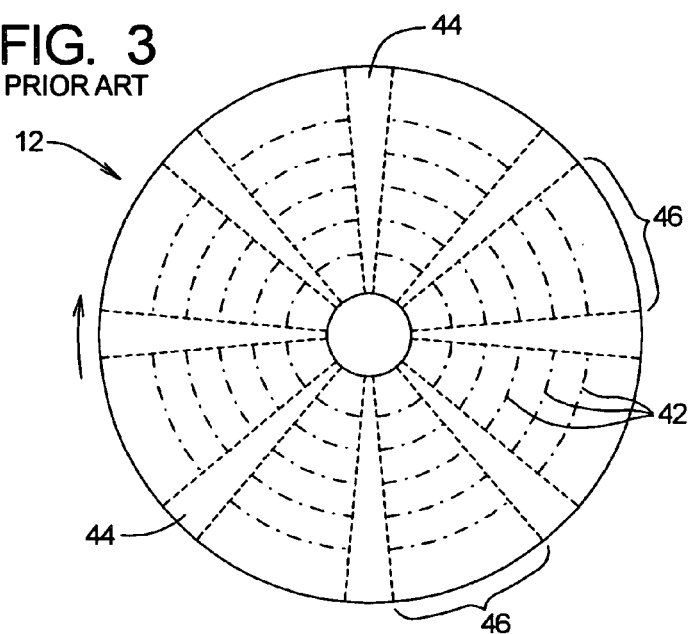
FIG. 3 is a diagrammatic representation of a top view of a magnetic storage disk illustrating a typical organization of data on a disk surface.
Figure 4:
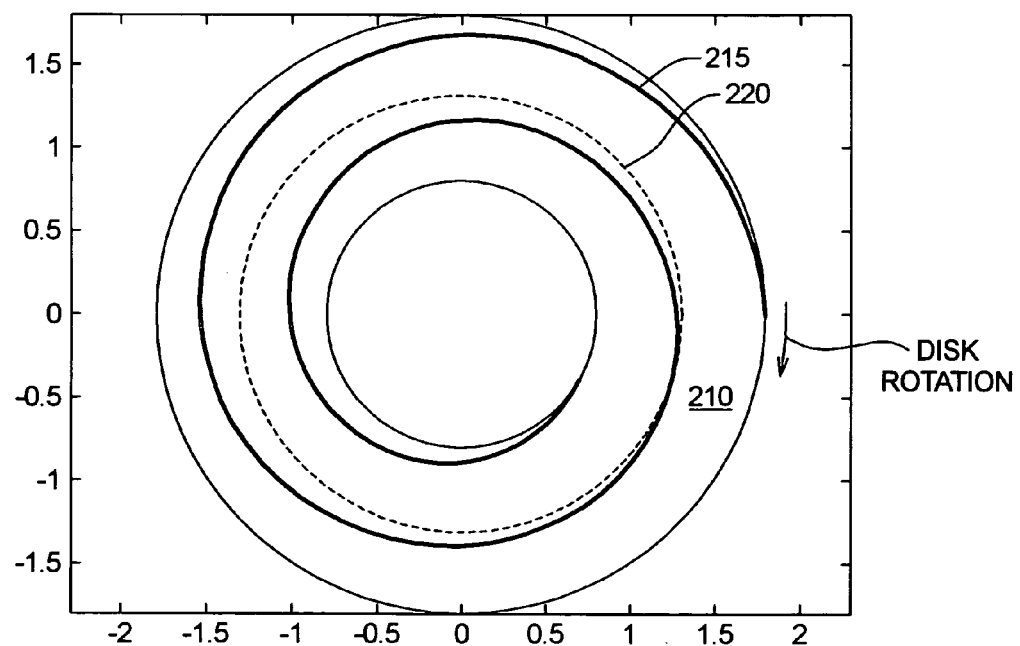
FIG. 4 is a diagrammatic representation of a disk surface having a spiral of servo information written thereon, along with a circular data storage track.
Figure 5:
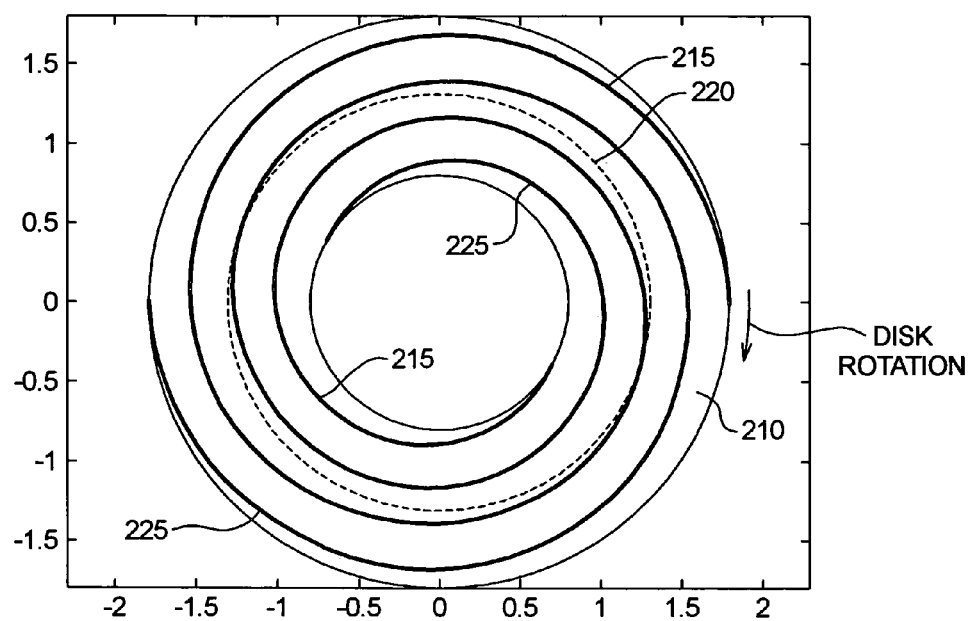
FIG. 5 is a diagrammatic representation of a disk surface having two spirals of servo information written thereon, along with a circular data storage track.
Figure 6:
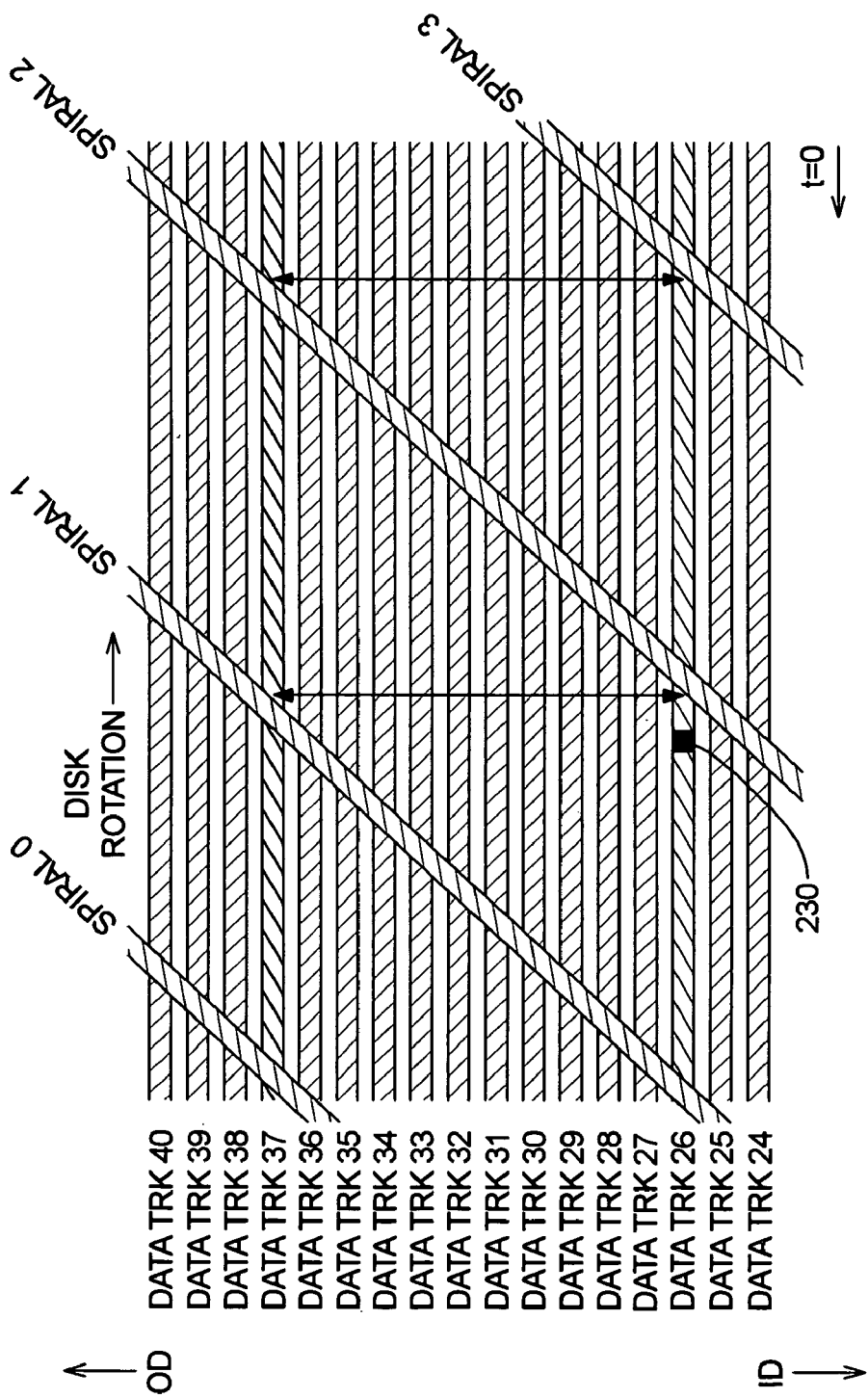
FIG. 6 is a diagrammatic representation of a magnified view of a portion of FIG. 5 showing additional spirals of servo information in a linear, instead of arcuate fashion, for ease of depiction.
Figure 7:
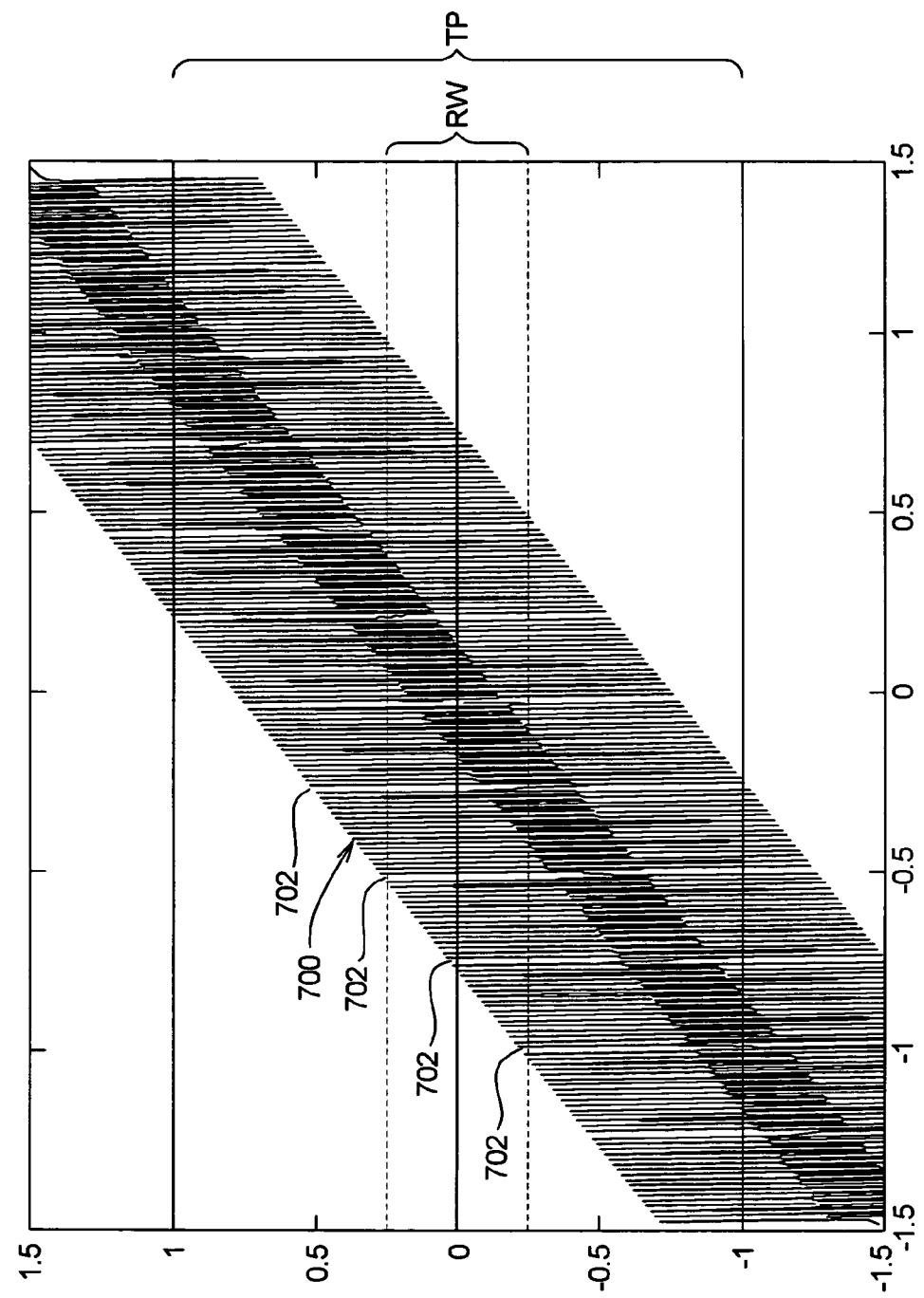
FIG. 7 is a diagrammatic representation of a magnified portion of one of the spirals of servo information shown in FIG. 6.
Figure 12:
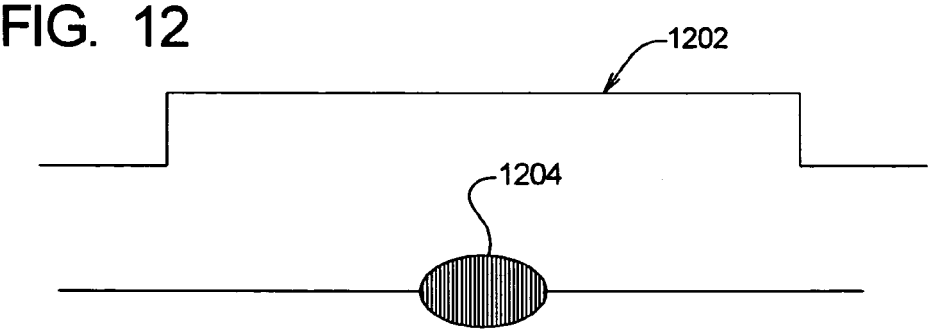
FIG. 12 is a schematic representation of an integration window and a read signal envelope, wherein the read signal envelope is centered in the integration window.
Figure 13A:
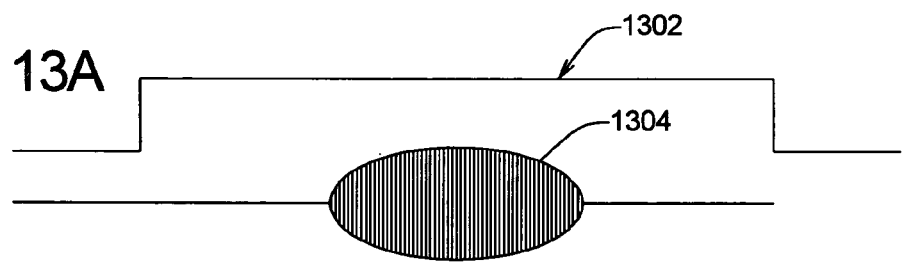
FIG. 13A is a schematic diagram illustrating a read signal envelope that is centered in an integration window.
Figure 13B:
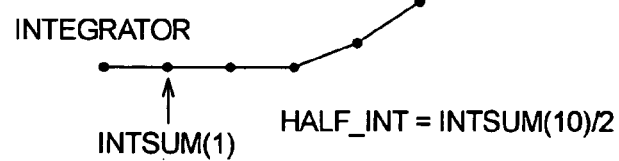
FIG. 13B is a schematic diagram illustrating a curve representing accumulated integration values across the integration window of FIG. 13A.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The spiral servo system (described in the background of the invention section, above) includes fixed-length integration windows. The fixed-length integration windows are spaced apart at standard intervals, which correspond to the spacing between spirals. However, initially, the integration windows are not synchronized to the spirals. The present invention is directed to a method and apparatus for acquiring onto (i.e., synchronizing to) the spiral servo information written on a disk surface of a disk drive after push-off.

One embodiment of the present invention is described in connection with FIG. 14. As an initial condition, the read head is positioned at some location relative to the disk surface such that spiral servo information is not available for reading (e.g., the head is unloaded).

First, an open-loop current (e.g., a current pulse in a first direction then a current pulse in a second direction) is delivered to the VCM to push the read head towards the middle diameter of the disk surface (or towards a middle region of the spiral servo information) (step 1410). The open-loop current pulse is selected such that the velocity of the read head is relatively low (preferably, very near zero) when it reaches the middle diameter of the disk surface. The magnitude of the open-loop current can be selected by experimentation on test drives.

Movement of the read head causes a back electromotive force (BEMF) to be generated in the VCM. As is well-known to those skilled in the art, the BEMF can be used to determine relative head velocities, because the magnitude of the BEMF generally increases as the velocity of the read head increases. Accordingly, a BEMF signal forms part of a feedback control loop to control the velocity of the read head (step 1415). Preferably, the BEMF feedback control loop brings the read head to a velocity near zero near the middle diameter of the disk surface.

A time period corresponding to two revolutions of the disk surface is provided to allow the BEMF feedback control loop to reduce the velocity of the read head, if needed (step 1420). Other time periods are possible and expected.

Next, fixed-length integration windows are opened at their standard intervals of time (step 1425). However, the integration windows are not synchronized with the spirals. Furthermore, at this point, the integration windows are not used to provide feedback to control the position of the read head.

Next, the integration windows are monitored to determine whether read signal envelopes appear within two consecutive integration windows (step 1430). To determine whether a read signal envelope appears within an integration window, an integration is performed over the integration window to yield an integration value, and a determination is made as to whether the integration value is greater than a predetermined threshold. In one embodiment, the predetermined threshold is approximately equal to an integration value associated with detecting a read signal envelope within an integration window. In setting the predetermined threshold, it may be necessary to account for the affects of noise on the integration value, especially if the integration window is very large or if the system is very noisy.

Before further discussion, it is important to understand that, at zero velocity, the time between read signal envelopes is equivalent to the center-to-center time between integration windows. However, the time between read signal envelopes will vary when the read head is moved across the disk surface at some velocity.

Returning to FIG. 14, an integration window timing loop is enabled (step 1435) using read signal envelope locations as feedback. Because the read head is moving at near-zero velocity, the time between read signal envelopes should be nearly equal to the center-to-center time between integration windows, but there is like to be some difference. So, even though read signal envelopes appeared in two consecutive integration windows (see step 1435), one or both read signal envelopes may appear near the edges of their integration windows. Accordingly, unless a timing adjustment is made, a next read signal envelope may appear outside of the next integration window.

Therefore, as part of the integration window timing loop, a measurement is made of the time between the two consecutive read signal envelopes. Using this measurement, the integration window timing loop adjusts (i.e., increases or decreases) the timing interval between the end of the integration window corresponding with the second read signal envelope and the beginning of the next integration window.

Accordingly, integration windows can be considered to be "chasing" read signal envelopes. In one embodiment, the integration window timing loop is a PID type of loop.

Next, the integration windows are monitored to determine whether read signal envelopes appear within N consecutive integration windows (step 1440), wherein the time between the N consecutive integration windows is equal to the standard interval. Again, to determine whether a read signal envelope appears within an integration window, an integration is performed over the integration window to yield an integration value. If the integration value is greater than a predetermined threshold, then a read signal envelope is considered to appear within the integration window. In one embodiment, for a spiral servo system with 192 spirals, N is equal to 192. It should be understood that other values may be used. For example, N can be lesser or greater by a factor of two or more.

If read signal envelopes do not appear within N consecutive integration windows, the timing loop performs additional timing adjustments. On the other hand, if read signal envelopes appear within N consecutive integration windows, the integration windows are considered to be synchronized to the spiral servo information.

Because the feedback from the BEMF control loop (generally) will be unable to bring the read head velocity to zero, control of the read head velocity is then switched to timing information provided by the integration windows (step 1445). Specifically, timing differences between read signal envelopes provide an indication of the velocity of the read head. The timing differences can be used as feedback to bring the velocity of the read head closer to zero.

When the velocity of the read head is less than a predetermined velocity threshold, the spiral servo system switches to a track following mode (step 1450), which is described in the background of invention section. Because there is a possibility that an error may occur when switching to the track following mode, the read head follows the track for a predetermined period of time (e.g., a period of time corresponding to two revolutions) and checks are made for servo errors during this predetermined period of time. If no servo errors occur during the predetermined period of time, the process is complete. That is, integration windows and the spiral servo information are considered to be synchronized and the read head is at zero velocity. Read signal envelopes should appear in the center of their corresponding integration windows.

In one embodiment, the BEMF feedback control loop is not provided. For example, if the open-loop current can be selected such that the read head velocity near the middle diameter is very near zero, then the BEMF feedback control loop would not be required. The inventors do note, however, that the BEMF feedback control loop does have value because constraints are placed on the read head velocity. Furthermore, velocity feedback is provided from the BEMF feedback control loop before valid velocity feedback is available from the integration windows.

In another embodiment, if a BEMF feed back control loop could bring the velocity of the read head below the predetermined velocity threshold, there would be no need for step 1445 (i.e., to switch control of the read head velocity from the BEMF feedback control loop to timing information provided by the integration windows). Instead, once the BEMF feedback control loop drove the velocity of the read head below the predetermined velocity threshold, the spiral servo system would switch to a track following mode (step 1450).

Figure 15:
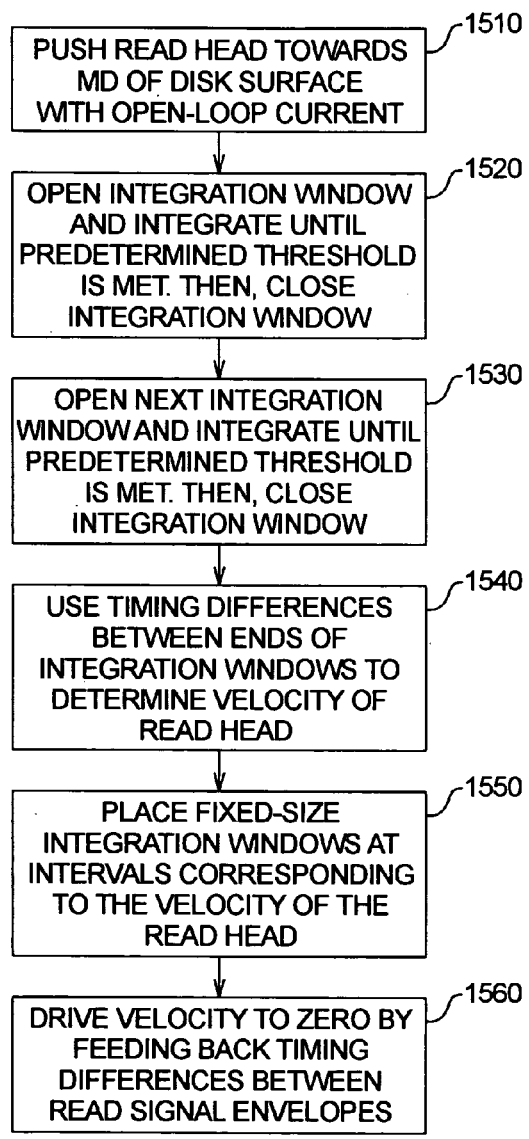
FIG. 15 is a flowchart illustrating another embodiment of the present invention; and, FIG. 16 is a flowchart illustrating yet another embodiment of the present invention.

Another embodiment of the present invention is described in connection with FIG. 15. Like the embodiment described in FIG. 14, first, an open-loop current is delivered to the VCM to push the read head towards the middle diameter of the disk surface (step 1510). The open-loop current pulse is selected such that the velocity of the read head is relatively low when it reaches the middle diameter of the disk surface.

Next, an integration window is opened (step 1520). An integration is performed along the integration window until an integration value meets a predetermined threshold. In one embodiment, the predetermined threshold is a value which corresponds to an integration value indicative of a read signal envelope being within a fixed-size integration window. When the predetermined threshold has been met, the integration window is closed.

Then, a next integration window is opened (step 1530). An integration is performed along the next integration window until the integration value meets a predetermined threshold that corresponds with a read signal envelope being within a fixed-size integration window. When the predetermined threshold has been met, the next integration window is closed.

The process of opening and closing integration windows can be repeated. The timing differences between ends of integration windows provides timing differences between read signal envelopes, which is proportional to the velocity of the read head (step 1540).

After measuring a sufficient number of timing differences between ends of integration windows, fixed-size integration windows may be placed at intervals corresponding to the velocity of the read head (step 1550). Accordingly, read signal envelopes will be within the fixed-size integration windows.

Finally, the velocity of the read head may be driven down to zero by feeding back the timing differences between read signal envelopes (step 1560). Accordingly, the interval between the fixed-size integration windows will be adjusted (either increased or decreased), until it corresponds to the standard interval associated with zero velocity. Then, the spiral servo system enters a track following mode (like step 1450).

In one embodiment, the integration window (see, e.g., step 1520) has a maximum timeout value. If the predetermined threshold is not reached prior to the expiration of the maximum timeout value, the integration value is reset to zero. The maximum timeout value is used, so that the threshold will not mistakenly be crossed due to integrating noise.

In another embodiment, instead of using cumulative integration values, differential integration values may be used.

Figure 16:
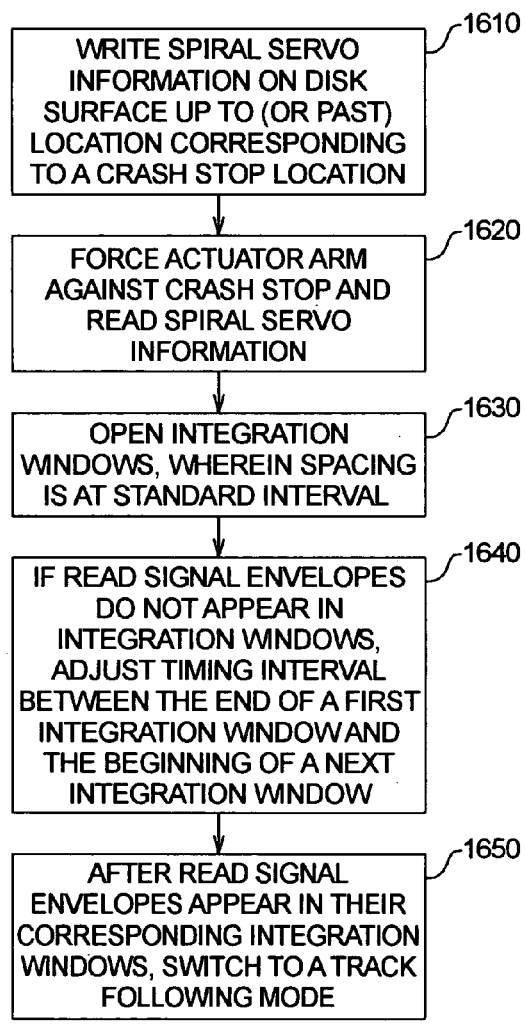

FIG. 16 is used to describe yet another embodiment of the present invention. First, when a disk (or disks) is outside of the disk drive, spiral servo information is written on the disk surface up to (or past) a location corresponding to a crash stop location (step 1610). That is, when the disk is inserted into the disk drive, the spiral servo information will be readable by the read head when the actuator arm is abutting the crash stop.

After the disk drive has been assembled, steps 1620-1650 can be performed to synchronize the spiral servo information with the integration windows. Specifically, the actuator arm is forced against the crash stop, and the spiral servo information is read (step 1620). Because the actuator arm is forced against the crash stop, the read head is at zero velocity. Accordingly, the synchronization algorithm can be simplified.

Next, fixed-length integration windows are opened, wherein the timing between the integration windows is initially a standard interval (step 1630). If read signal envelopes do not appear in the integration windows, adjustments (i.e., increases or decreases) are made to the timing interval between the end of a first integration window and the beginning of the next integration window (step 1640). After the timing adjustment has been made, a determination is again made as to whether the read signal envelopes are within their integration windows.

Timing adjustments may be continued to be made until read signal envelopes appear in their corresponding integration windows, at which point a switch is made to a track following mode (step 1650). It should be noted that, prior to switching to the track following mode, additional timing adjustments may be made to move read signal envelopes closer to the center (or to the center) of their corresponding integration windows.

As will be understood by those skilled in the art, there are many variations to the above-described techniques. The variations would generally include a method of detecting read signal envelopes and a method for measuring the time between read signal envelopes. The time between read signal envelopes would then be used as feedback for both a velocity control loop and for adjusting the interval between a first integration window and a next integration window.

It should be understood that aspects of the various embodiments may be combined with one another, as appropriate.

The present invention has been described in connection with integration windows. It should be understood that the present invention may be used with other position demodulation techniques that do not require integration windows.

It should also be understood that the present invention may be based in hardware, firmware or software.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
providing a storage surface and a read head associated therewith, said surface having spiral servo information written thereon and concentric data tracks and said read head generating a read signal envelope when reading said spiral servo information;
applying current to an actuator voice coil coupled to the read head to provide substantially zero radial movement relative to the concentric data tracks; and
determining a time difference in relation to a first time at which a first read signal envelope is detected by the read head and a second time at which a second read signal envelope is detected by the read head.

2. The method of claim 1 further comprising determining a velocity of the read head in relation to the determined time difference.

3. The method of claim 1 wherein the first read signal envelope is within a first integration window, wherein the second read signal envelope is within a second integration window, and wherein, based on said time difference, a third integration window is opened at an interval of time after the second integration window.

4. The method of claim 1 wherein the current applied to the voice coil is characterized as an open-loop current delivered to a voice-coil motor.

5. The method of claim 1 wherein the current applied to the voice coil during the applying step is adjusted in relation to a detected back electromotive force (bemf) signal from the voice coil.

6. A method comprising the steps of:

providing a storage surface and a read head associated therewith, said surface having spiral servo information written thereon and said read head generating a read signal envelope when reading said spiral servo information;

applying current to an actuator voice coil coupled to the read head to move the read head relative to the surface;

opening integration windows to detect at least two consecutive read signal envelopes from the read head; and adjusting a timing interval between successive ones of said integration windows until the at least two consecutive read signal envelopes are respectively detected therein.

7. The method of claim 6 wherein the applying step comprises applying an open-loop current to a voice coil motor to move said read head.

8. The method of claim 7 wherein said open-loop current is selected so as to position the read head near an intermediate portion of the surface.

9. The method of claim 6 wherein the current applied to the voice coil during the applying step is adjusted in relation to a detected back electromotive force (bemf) signal from the voice coil.

10. The method of claim 6 wherein a read signal envelope appears within an integration window when, after integrating over the integration window, an integration value exceeds a predetermined threshold.

11. The method of claim 6 further comprising a step of driving a velocity of the read head to a value of substantially zero in relation to timing differences between successive ones of the detected read signal envelopes during the obtaining step.

12. The method of claim 11 wherein the providing step further comprises providing a write head coupled to the read head, and wherein the method further comprises a step of writing final servo data to the surface using the write head after the driving step.

13. The method of claim 6 wherein the applying step comprises a step of biasing an actuator arm coupled to the read head against an outer crash stop, and wherein the obtaining step is carried out during the biasing step.

14. The method of claim 6 further comprising a step of switching to a track following mode when a timing difference between successive ones of the detected read signal envelopes during the obtaining step is within a predetermined threshold level.

15. An apparatus comprising:

a storage surface and a read head associated therewith, said surface having spiral servo information written thereon and concentric data tracks and said read head generating a read signal envelope when reading said spiral servo information; and a controller which directs an application of current to an actuator voice coil coupled to the read head to provide substantially zero radial movement relative to the concentric data tracks, and to determine a time difference in relation to a first time at which a first read signal envelope is detected by the read head and a second time at which a second read signal envelope is detected by the read head.

16. The apparatus of claim 15 wherein the controller further operates to determine a velocity of the read head in relation to the determined time difference.

17. The apparatus of claim 15 wherein the current applied to the voice coil is characterized as an open-loop current delivered to a voice-coil motor.

18. The apparatus of claim 15 wherein the controller further operates to adjust the current applied to the voice coil in relation to a detected back electromotive force (bemf) signal from the voice coil.

19. The apparatus of claim 15 further comprising an outer crash stop and wherein the current applied to the voice coil operates to bias an actuator arm coupled to the read head against the outer crash stop while the controller operates to determine said time difference.

* * * * *